Dec. 31, 1929.   T. TAAFFE ET AL   1,741,255
MILEAGE INDICATOR
Filed April 28, 1928   2 Sheets-Sheet 1
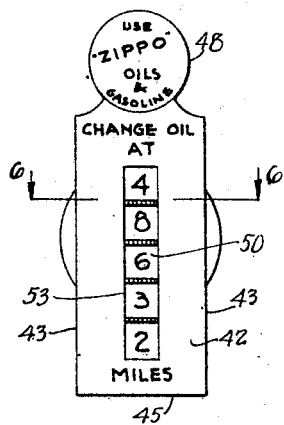
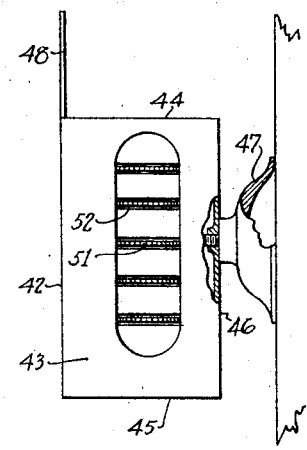
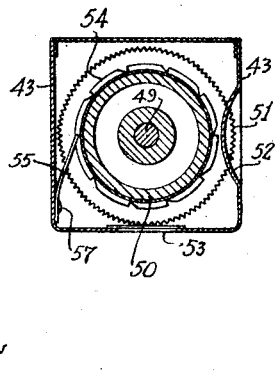
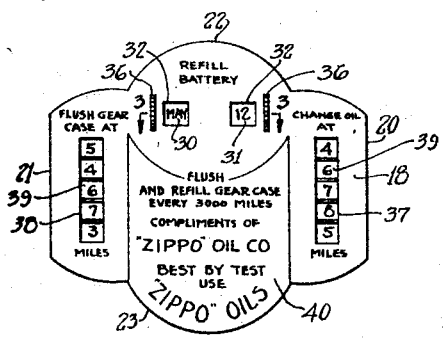
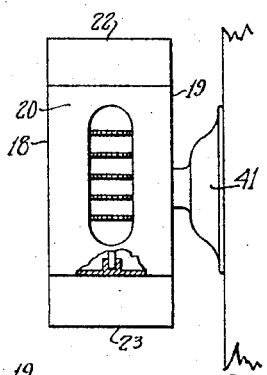
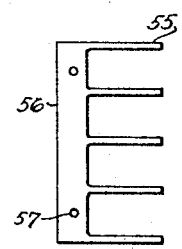
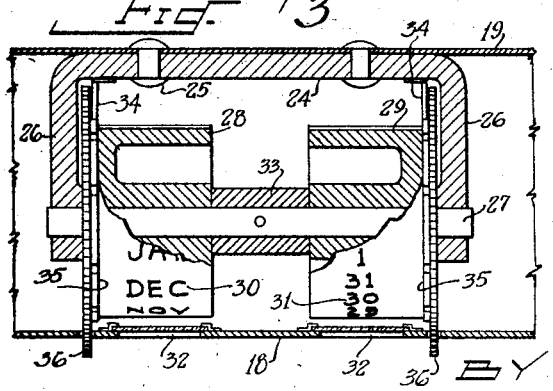

Dec. 31, 1929. T. TAAFFE ET AL 1,741,255
MILEAGE INDICATOR
Filed April 28, 1928 2 Sheets-Sheet 2
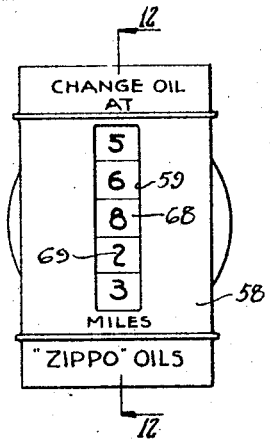
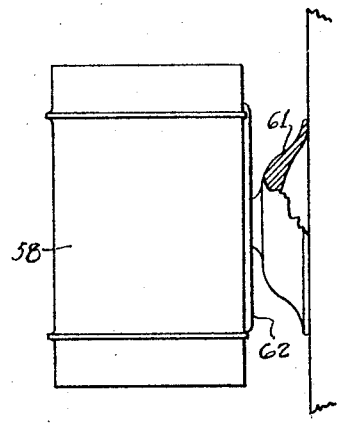
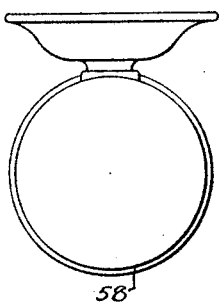
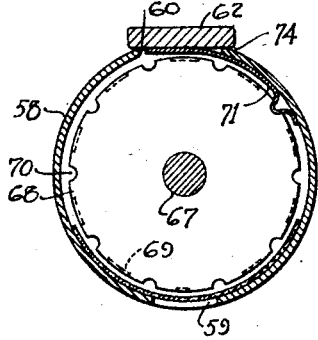
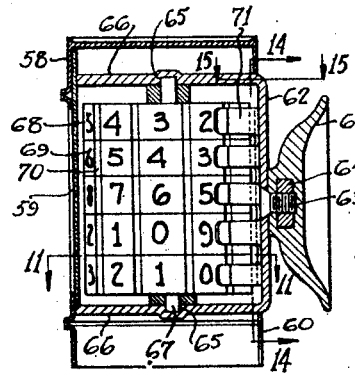
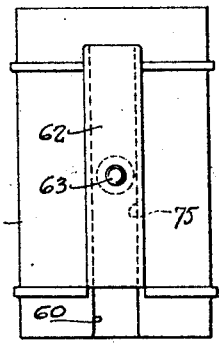
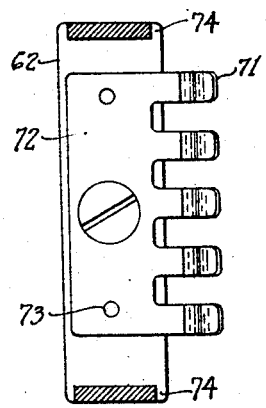
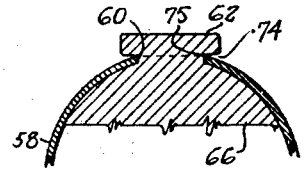
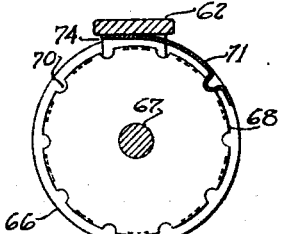
INVENTORS
T. Taaffe
R. O. Welch
BY C. B. Birkenbeul
ATTORNEY Patented Dec. 31, 1929

1,741,255

UNITED STATES PATENT OFFICE

THOMAS TAAFFE AND ROBERT O. WELCH, OF PORTLAND, OREGON; SAID WELCH ASSIGNOR TO SAID TAAFFE

MILEAGE INDICATOR

Application filed April 28, 1928. Serial No. 273,590.

This invention relates generally to the automotive industry, and particularly to a means for indicating times at which certain duties must be performed.

The main object of this invention is to provide an exceedingly simple and efficient indicator whereby the caretaker of an automobile is always advised as to the proper time for changing crank case oil, or performing any other duty about the car such as lubricating other parts, attention to battery, etc.

The second object is to provide an additional safeguard for an automobile by insuring its proper attention without the necessity for recording with pen or pencil when certain duties have been performed or must be repeated.

The third object is to construct a device which will be easy to manufacture and install on an automobile and which will be especially adapted for advertising purposes.

These, and other objects, will become more apparent from the specification following as illustrated by the accompanying drawings, in which:

Figure 1 is a front elevation of one form of the device. Figure 2 is a side view of Figure 1. Figure 3 is a section taken along the line 3—3 in Figure 1. Figure 4 is a side elevation of an alternative form of the device. Figure 5 is a side elevation of Figure 4 with a portion of the holding cup broken away. Figure 6 illustrates a typical form of indexing mechanism taken as a section along the line 6—6 in Figure 4. Figure 7 is a detail of the comb spring employed for indexing the dials. Figure 8 is a front elevation of a cylindrical form of the device. Figure 9 is a side elevation of Figure 8 and Figure 10 is a plan of Figure 8. Figure 11 is a horizontal section taken along the line 11—11 in Figure 12. Figure 12 is a vertical section taken along the line 12—12 in Figure 8. Figure 13 is a rear elevation of Figure 8 showing the holding cup removed. Figure 14 is a vertical section taken along the line 14—14 in Figure 12. Figure 15 is a fragmentary section taken along the line 15—15 in Figure 12. Figure 16 is a horizontal section taken along the line 11—11 in Figure 12 with the cover removed.

Similar numbers of reference refer to similar parts throughout the several views.

Referring in detail to the drawings, in the first illustrated form of the device included in Figures 1 to 3 there is shown a casing consisting of a front 18, a back 19, sides 20 and 21, a top 22 and a bottom 23. Mounted against the back 19 is a frame 24 which is secured thereto by means of the rivets 25. From the frame 24 project the standards 26 which carry the shaft 27 on which are mounted the cylindrical dials 28 and 29, the former bearing the month names 30, and the latter the dates 31 of the month. Openings 32 are formed in the front 18 to make the month and date indications visible.

A spacer 33 on the shaft 27 is used to hold the dials 28 and 29 apart and to prevent their imparting motion to each other. Detents 34 are provided to hold the dials 28 and 29 in the desired position. These detents engage the notched wheels 35 which are secured to the dials 28 and 29, and the wheels 36 which are also secured to the dials 28 and 29 project through the front 18 to permit hand setting of the dials. At each side of the front 18 are formed the upright windows 37 and 38 in which are visible the dials 39. The window 38 has placed near same a notice to "Flush gear case" at a predetermined mileage as shown on the dials, and the window 37 has placed near same a notice to "Change oil" at the mileage showing in that window.

The space 40 of the front 18 may be preserved for advertising purposes, or other instructions in regard to the upkeep of the car.

To the back 19 is secured a rubber cup 41 of the vacuum type by means of which the device may be attached to the wind shield, or other portion of the car.

The mechanism for operating the dials behind the windows 37 and 38 may be identical with any of the forms of the device shown in Figures 5, 6, 7, 11, 12 or 14.

In the form of the device shown in Figures 4 to 7 there is provided a square tubular case having a front 42, sides 43, top 44 and bottom 45. To the back 46 is attached the rubber suction cup 47 by means of which the device may be attached to the wind shield, as previously suggested. The front 42 may have its upper end 48 projecting beyond the top 44 and shaped as desired for carrying advertising or decorative material. Within the casing is mounted an upright shaft 49 on which are placed a plurality of dials 50, alongside of which are placed the adjusting wheels 51 which project through slots 52 in the side 43. A window 53 is formed in the front 42 to disclose one number of each dial 50.

Notched wheels 54 are also secured to each dial 50 and the detent 55, which is secured to one side 43, engages the notches in the wheel 54 for the purpose of holding the dials in the desired position. It is preferable to make the various detents 55 in the form of a comb whose back 56 may easily be secured by means of the rivets 57 to the side 43.

Turning now to the form of the device shown in Figures 8 to 16 inclusive there is shown a casing 58 which, for advertising purposes, is made in the form of a steel drum such as is commonly used for transporting oil. This casing is provided with a window 59 on the front side thereof and a slot 60 on its rear side. A rubber suction cup 61 is secured to the upright frame 62 by means of the screw 63 which threads into the nut 64 molded within the cup 61. Recesses 65 are formed in the outwardly turned ends 66 which are formed integral with the frame 62, and these recesses carry the upright shaft 67 upon which are mounted the various dials 68 which have formed therein the recessed numbers 69 between which are formed the notches 70 which engage the detents 71 which, in turn, are all formed on the back 72, which back is secured to the frame 62 by means of the rivets 73.

The junction between the ends 66 and the frame 62 is provided with notches 74 which receive the edges 75 of the slot 60.

In Figure 11 it will be seen that the detents 71 lie close to the inside of the casing 58, but in Figure 16 the casing 58 is removed making it possible for the dials 68 to be rotated manually when the casing 58 is removed, but holding same stationary when the casing 58 is in position.

The operation of this form of the device is as follows. When the user thereof changes oil in the crank case, or performs some other task of which he wishes to record the mileage, he may do one of two things, either remove the casing 58 by lifting it up vertically and slipping it off of the device and then rotating the dials to the speedometer reading at the time the task was performed; or he may set the device ahead to the speedometer reading which will be visible when this task should again be performed. For example, if he has changed oil in the crank case at twenty-six thousand five hundred miles, and he makes a practice of changing this oil every five hundred miles, he can set the dials to read twenty-seven thousand and then replace the casing 58 and all that it will be necessary for him to do will be to observe when the speedometer reading and the reading on his dial again agree with each other, which will be the correct time for him to again change the oil. Of course the same thing applies to other operations such as attention to the battery, crank case lubrication or other operation which must be performed with the modern motor car.

The main difference between the various forms of the device disclosed in the drawings is in its outer frame. The type shown in Figures 1 to 3 is more elaborate and has several dials, whereas the type shown in Figures 4 to 16 has only a single set of dials.

It must be understood that in this mechanism there is absolutely no driving connection between the various dials of any set, the desire being to make it possible to re-set any set of dials directly and quickly without the necessity of passing through all the intervening numbers, or for providing a mechanism which will make such action possible.

It will be seen that there is provided an exceedingly simple and highly efficient form of mileage indicator which will be extremely useful and assist the car owner in more efficiently servicing his car.

We claim:

1. In a mileage indicator the combination of a frame, a shaft mounted in said frame, a plurality of dials mounted on said shaft operable independently of each other, spring detents for said dials for permitting movement of said dials, and a casing slidably mounted over said frame surrounding said dials whereby said detents will lock said dials against rotation when the casing is in position.

2. A mileage indicator having in combination an upright frame having a suction cup attached thereto for mounting said frame on a flat surface, said upright frame having a pair of forwardly projecting arms, a shaft mounted between said arms, a plurality of independently operable dials mounted on said shaft, spring detents for movably holding said dials in any desired position, and a cylindrical casing adapted to slide downwardly over said frame ends and enclose said dials, said casing having an opening formed in the front thereof through which one number of each dial can be seen.

3. A mileage indicator consisting of a frame, a suction cup secured to the rear side of said frame, a circular arm projecting forwardly from each end of said frame, a shaft mounted between the centers of said circular arms, a plurality of independently operable numbered dials mounted on said shaft having notches formed between the numbers thereof, a plurality of integral spring detents mounted on said frame adapted to engage said notches, a cylindrical casing having one end thereof closed and having the rear side thereof slotted to receive said frame, said casing having a slotted opening formed in the front thereof, and a transparency therein covering said slotted opening, said casing serving to hold said detents into said notches in a manner to prevent rotation of said dials when said casing is in place.

4. In a mileage indicator the combination of a frame, a plurality of separately movable numbered dials mounted on said frame each of said dials having notches in the periphery thereof, and a spring detent mounted on said frame having a plurality of arms formed thereon adapted to engage said notches and index said disks.

5. In a mileage indicator the combination of a U-shaped frame having a plurality of spring detents mounted along the inner side of its closed end, and a plurality of notched counting wheels registering with said detents.

6. In a mileage indicator the combination of a U-shaped frame having a plurality of spring detents mounted along the inner side of its closed end, a plurality of notched counting wheels registering with said detents, and means for holding said detents against withdrawal from said notches.

7. In a mileage indicator the combination of a frame, a plurality of independently movable counting dials mounted in said frame on a common axis, and a case enclosing said dials constituting a locking means slidably parallel with the axis of said dials whereby same are held against rotation.

8. In a mileage indicator the combination of a frame, a plurality of independent rotatable counted dials mounted on said frame, spring detents for temporarily holding said dials during re-setting, and a lock slidably parallel to the axis of said dials for holding said dials against rotation between re-settings.

THOMAS TAAFFE.
ROBERT O. WELCH.